No. 659,356. Patented Oct. 9, 1900.
F. L. YOUNG.
CULTIVATOR.
(Application filed Jan. 8, 1900.)
(No Model.)

WITNESSES:
M. E. Verkick.
Edith L. Miller

INVENTOR
Frank L. Young
BY Eugene Driven
ATTORNEY

UNITED STATES PATENT OFFICE.

FRANK L. YOUNG, OF LOCKPORT, NEW YORK.

CULTIVATOR.

SPECIFICATION forming part of Letters Patent No. 659,356, dated October 9, 1900.

Application filed January 8, 1900. Serial No. 713. (No model.)

*To all whom it may concern:*

Be it known that I, FRANK L. YOUNG, a citizen of the United States, residing at the town of Lockport, in the county of Niagara and State of New York, have invented certain new and useful Improvements in Cultivators, of which the following is a specification.

My invention relates to improvements in cultivators wherein the side bars or wings are made adjustable to and from the central bar to increase or decrease the width of the track of the cultivator; and the object of my improvements is to provide this type of cultivator with additional supplementary side bars hinged to the rear end of the central bar and forming flexible rearward continuations of the main side bars, said supplementary side bars having attached thereto additional cultivator-teeth in continuous operative positions at each side of the central bar and also certain auxiliary teeth which are brought into play more especially when the frame is fully extended to more thoroughly pulverize the ground and destroy the weeds at all points in the track of the cultivator and to leave the cultivated earth level and smooth instead of uneven and in ridges or furrows, as it has heretofore been left by this type of cultivator, the intention being to leave the ground level and smooth in order to prevent the washing of it by storms following cultivation and the evaporation of the moisture, which naturally and quickly emanates therefrom when left in ridges and furrows. I attain this object by the mechanism illustrated in the accompanying drawings, in which—

Figure 1:
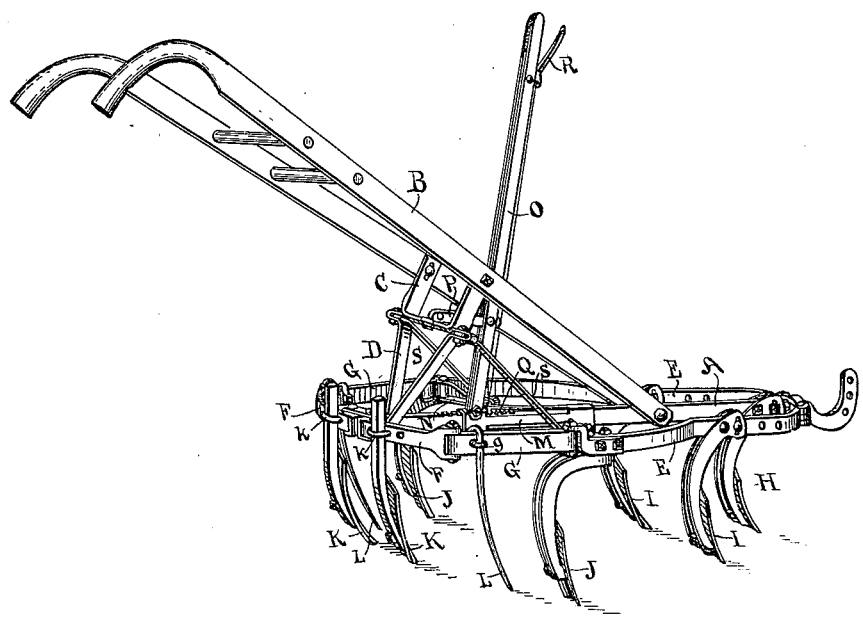
Figure 2:
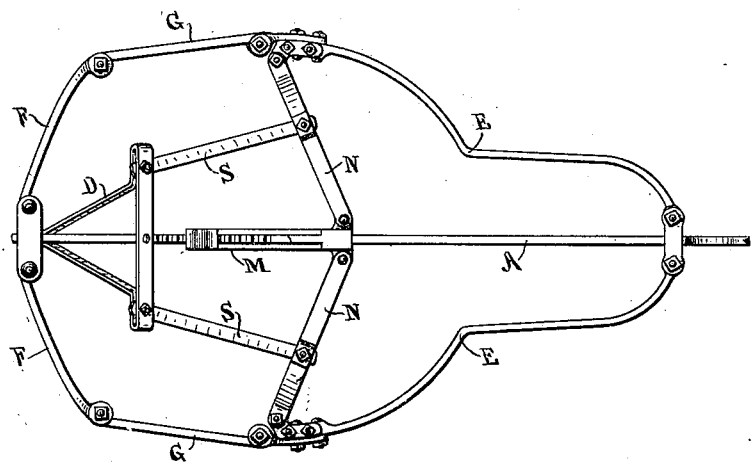

Figure 1 is a perspective view of my improved cultivator, the usual guide-wheel and its adjusting mechanism being omitted; Fig. 2, a plan view of the frame and adjusting links.

Similar letters refer to like parts in the two views.

A represents the central bar of the cultivator, to which are attached the handles B, these handles being supported from the rear of the central bar in the present instance by means of the composite brace C D.

E E represent the main side bars, which are hinged at their forward ends to the central bar A. To these main side bars are attached the cultivator-teeth I I and J J and at the forward end of the central bar the tooth H. At the rear end of the central bar I add two laterally-projecting bars or arms F F, pivotally connected thereto, these bars F F being connected to the main side bars E E by means of the connecting-bars G G, the frame of the cultivator being thus made up of seven members—namely, the central bar A, the two forward or main side bars E E, the two rear side bars F F, and the connecting-bars G G, all of said members being connected together by pivotal bolts.

On the two rear side bars I fasten two additional cultivator-teeth K K in position to cut up the ground in paths intermediate between the paths of the tooth H and the teeth I I. These teeth K K are supported upon uprights which are secured to the bars F F by means of clips or strap-bolts *k*, passing through holes in the bars, as shown in Fig. 1. These uprights may be secured in any desirable lateral adjustment upon the bars F F by providing said bars with additional holes to receive the clips.

To the connecting-links G G, I attach a second set of auxiliary teeth L L, which teeth follow behind the teeth J J when the frame is contracted, their object being in that position to act as a harrow to more fully pulverize the ground and when the cultivator-frame is extended to its fullest extent to level the ground between the teeth I I and J J, it being readily apparent upon inspection of the drawings that in such extended position of the frame these teeth L will be drawn inside of the teeth J. These teeth L L, I preferably form of single bars, as shown, with their ends bent over the bars G G at the top and secured in position by clips *g*.

The expanding and contracting mechanism for the side bars herein illustrated is not new, except in its application to and combination with my improvement and to the whole cultivator with my improvement attached, and I therefore claim no part of it as my invention. It comprises the slide M upon the central bar A, the forward end of which is coupled to the rear ends of the main side bars E E by the links N N. To the rear of the slide M is coupled the operating-lever O, which lever is fulcrumed upon the swinging bar P, coupled to the brace C. The top of the central bar A is provided with a series of notches which are engaged by a spring-tooth Q, attached to the slide M, said tooth being operated by the small hand-lever R on the operating-lever O, the slide being thereby locked to the central bar or released to slide thereon at the will of the operator. The links N N are fulcrumed at intermediate points in their length upon the ends of the swinging fulcrum-bars S S, which depend from the side wings of the brace D.

The operation of this cultivator and my improved attachment, as applied thereto, will now be clearly apparent—that is to say, when the lever O is thrown forward the slide M will be drawn to the rear, thereby causing the links N N to expand the main side bars of the cultivator, and when the lever O is drawn toward the operator the slide M would be moved to the front, thereby causing the links N N to contract the said side bars. At the same time with the expansion and contraction of the main side bars the rear side bars F F and connecting-bars G G will be actuated to bring the additional and auxiliary teeth carried thereby into position to properly coact with the main teeth carried by the side bars E E, and thus the proper adjustment of said teeth will be attained at one and the same time with the expansion or contraction of the main side bars and by the one manipulation of the lever O.

While I have illustrated my improved attachments as having been applied to an old cultivator, it will be quite apparent that not only may these attachments be applied to cultivators now in use, but also that cultivators may be manufactured with such attachments applied thereto in any suitable manner, and I do not therefore confine myself to the particular mode of application or construction of the parts as illustrated.

Having thus described my improvements, what I claim, and desire to secure by Letters Patent, is—

1. In a cultivator, the combination of a central bar, flexibly-jointed three-part side bars carrying cultivator-teeth upon each side of the central bar and hinged thereto at front and rear, and mechanism for expanding and contracting said side bars.

2. In a cultivator, the combination, with the central bar and two main side bars hinged thereto at the forward end, of two laterally-projecting side bars hinged to the rear of said central bar, connecting-bars pivotally connected to the free ends of said main and rear side bars, additional and auxiliary teeth carried by the rear side bars and the connecting-bars, and mechanism for expanding and contracting the main side bars.

In testimony whereof I have affixed my signature in presence of two witnesses.

FRANK L. YOUNG.

Witnesses:
R. S. KEEFE,
S. W. DEMPSEY.